Feb. 28, 1939. C. ROSSINI ET AL 2,148,879
BROILER
Filed Aug. 12, 1938
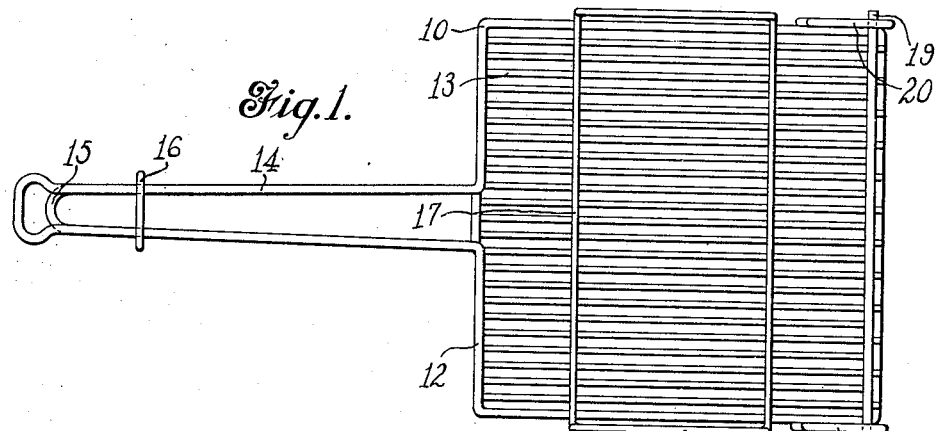
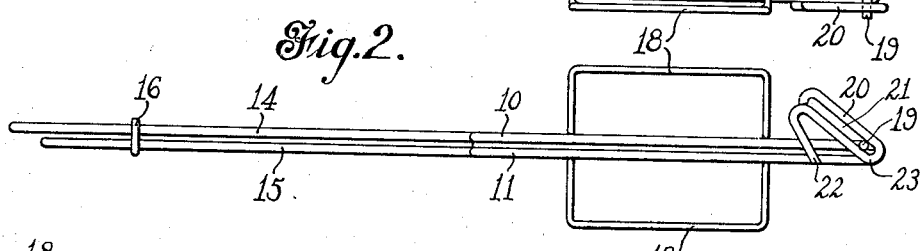
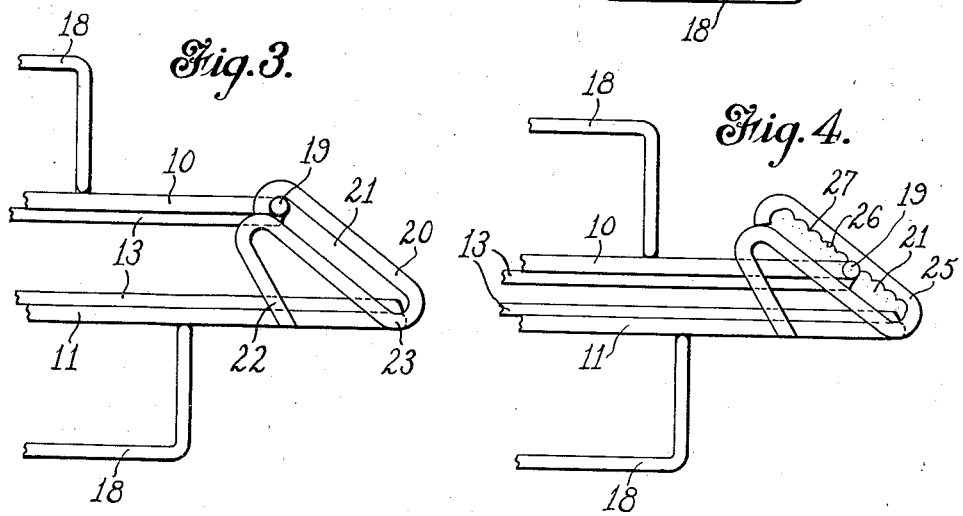
Inventors
Caesar Rossini
Tazio D. Pieragostini
By Rolsen & Bartholow
Attorneys Patented Feb. 28, 1939

2,148,879

UNITED STATES PATENT OFFICE 2,148,879

BROILER

Caesar Rossini and Tazio D. Pieragostini,
New Haven, Conn.

Application August 12, 1938, Serial No. 224,600

5 Claims. (Cl. 53—5)

This invention relates to broilers, and more particularly to a broiler which comprises a pair of cooperating grid members of substantially the same shape and configuration, which are hingedly connected at one end and adapted to be clamped together, with the material to be broiled between them.

As is well known, such grids are commonly made with non-adjustable hinge connections so that the distance apart or separation of the grid members is more or less constant except for such difference in spacing as may be allowed by the ability of the grids themselves to be sprung apart. This is disadvantageous, as the article of food to be broiled may be cut in either a very thin slice or a very thick slice, and the broiler should be readily and quickly adjustable to receive and securely hold a slice of material of any thickness within reasonable limits.

One object of this invention is to provide a broiler comprising a pair of grid members which are adjustably hinged together in such a manner that the hinge will automatically adjust itself to the thickness of the slice of material to be broiled.

A still further object of the invention is the provision of a broiler having grid members adjustably hinged together such that the adjustment of the broiler will be automatic, and at the same time the broiler may be economically manufactured and sold, and be of very simple structure.

A still further object of the invention is the provision of a broiler comprising a pair of grid members one of which is provided with projecting trunnions and the other provided with a runway or slot to receive these trunnions, the runway being disposed in an inclined position relatively to the plane of the grid upon which it is mounted, so that the adjustment of the distance between the grids to the thickness of the slice of material to be broiled may be readily made, and whereby the adjustment will be automatically maintained when the grid members are secured together at the end opposite the hinged end.

To these and other ends the invention consists in the novel features and combinations of parts to be hereinafter decribed and claimed.

In the drawing:

Fig. 1 is a side elevational view of a broiler embodying our invention;

Fig. 2 is a top plan view of the same;

Fig. 3 is an enlarged fragmentary view of the forward end of the broiler; and

Fig. 4 is a view similar to Fig. 3 showing a slight modification.

To illustrate a preferred embodiment of our invention we have shown a broiler comprising a pair of cooperating grid members 10 and 11. These grid members as shown are of rectangular form, and as shown in Fig. 1 each comprises a rectangular outer frame 12 having a plurality of longitudinal rods or wires 13 spanning opposite members of the frame. As shown in Fig. 2, these grid members are provided with handles 14 and 15, the handle 14 being slightly longer than the handle 15 and supporting slidably thereon a loop 16 which serves to clamp the handles together in a well-known manner.

The grids are also provided with transversely extending members 17 which are turned laterally at their ends to provide loops or stirrups 18 at both the upper and lower ends of the grids, as shown in Fig. 1. It will be understood that in the customary use of the broiler herein shown it is used in an upright or vertical position, as shown in Fig. 1, being inserted between two heating or cooking elements so that the slice of material may be broiled simultaneously on both sides. When so inserted, the loops or stirrups 18 are designed to slidably engage above supporting members so as to properly suspend the grid between the two heating elements.

One of the grids, the upper one, as shown in Fig. 2, is provided at the right-hand end and adjacent its side edges with trunnions 19 which project laterally from the rectangular frame portion 12 of the grid. These trunnions are designed to be received in slotted members 20 secured at the side edges of the lower grid 11. As shown, the members 20 are formed of a strip of material folded or turned upon itself to form the slot 21. One end of the strip of material may be continued and turned downwardly, as shown at 22, so that its lower end may be welded to the grid 11, as well as the strip at the lower end of the slot 21, as shown, for example, at 23. This provides for the welding of the member 20 at two points to the grid, so that a strong construction will result.

It will be noted that the slot 21 is inclined upwardly and forwardly relatively to the plane of the grid to which it is secured, as shown in Fig. 2, and it will be understood that usually when the material is placed in the broiler the latter will normally occupy a horizontal position, as shown in this figure. This inclination of the slot 21 is of considerable importance in the operation of the device, in that it renders it more or less automatic and much easier to manipulate than would be the case if the slot were directly vertical.

For example, in placing a slice of material between the grid members 10 and 11, the loop member 16 is moved toward the left until it clears the handle 15, when the upper grid member 10 may be raised by the handle 14 to permit the insertion of the slice of material to be broiled. It is then possible, by merely drawing the handle 14 forwardly, to cause the trunnions 19 to ride upwardly in the slot 21, these trunnion members riding over the inclined lower strip below this slot. When the member 14 is released after the slice of material has been placed between the members, the grid 10 will assume its proper position in contact with the material, and at a distance from the grid 11 equal to the thickness of the slice, the trunnion 19 sliding downwardly in the inclined slot so as to accommodate itself properly to the thickness of the slice of the material. If then the handles 14 and 15 are pressed together and secured by the loop 16, a slight pressure upwardly on the trunnions 19 will result. This will cause the trunnions to bind against the upper edges of the slots 21, and as the member 14 will normally be held from moving forwardly or to the left, as shown in Fig. 2, the grids 10 and 11 will not separate, but will be held automatically in the proper position by friction. On the other hand, as the slots 21 are perfectly smooth, the trunnions will be permitted to ride freely therein, and so be always self-adjusting to the thickness of the slice of material.

Although not always necessary, it may be desired to provide some means to positively hold the trunnions 19 in any desired adjusted position. It will, of course, be advantageous to do this without interfering with the free sliding movement of the trunnions in the inclined slots. Such an arrangement is shown in Fig. 4, wherein the slotted member 25 is provided with a plurality of recesses or depressions 26 forming between them teeth or projections 27. These depressions are preferably of arcuate shape in cross-section, as shown, so that they will receive a portion of the rod-like trunnions 19. These recesses are provided upon the upper of the two members forming the slot 21, so that the trunnions will always slide freely upon the lower member of the slot, but at the same time, when the grid 10 is moved slightly to the right, as shown in Figs. 2 or 4, or is closed upon a slice of material to be broiled, the trunnions will enter these recesses and be positively held at the proper adjustment.

It will be understood that the grids may be made of wire or rod-like material of any suitable diameter, and that where the members cross or are joined together, this may be suitably done by welding, so that a strong and effective broiler results.

While we have shown and described some preferred embodiments of our invention, it will be understood that it is not to be limited to all of the details shown, but is capable of modification and variation within the spirit of the invention and within the scope of the appended claims.

What we claim is:

1. A broiler comprising a pair of cooperating grid members, a handle secured at one side of each of said grid members projecting therefrom, means to clamp said members together, members hingedly connecting said grid members at the sides thereof opposite the handles, said connecting members comprising means on one grid providing slots in inclined relation relatively to the plane of the grid, and a trunnion upon the other grid member slidable in said slots.

2. A broiler comprising a pair of cooperating grid members, a handle secured at one side of each of said grid members projecting therefrom, means to clamp said members together, members hingedly connecting said grid members at the sides thereof opposite the handles, said connecting members comprising means on one grid providing a forwardly and upwardly inclined slot, and a member on the other grid slidably adjustable in said slot to adjustably hinge said grids together.

3. A broiler comprising a pair of cooperating grid members, a handle secured at one side of each of said grid members and projecting therefrom, means to clamp said handles together, one of said grid members being provided at each of its edges on the side thereof opposite the handles with a member having a forwardly inclined slot, and the other of said grids having laterally projecting trunnions slidably mounted in said slots to hinge said grid members together and allow for adjustment in the spacing apart of said members in parallel relation.

4. A broiler comprising a pair of cooperating grid members, a handle secured at one side of each of said grid members projecting therefrom, means to clamp said members together, members hingedly connecting said grid members at the sides thereof opposite the handles, said connecting members comprising a member secured to one grid and bent to provide a pair of spaced parallel portions having an inclined slot therebetween, the upper of said portions having recesses therein facing the slot, and the other of said grid members having a trunnion thereon slidably mounted in said slot.

5. A broiler comprising a pair of cooperating grid members each having a handle secured at one side thereof and projecting therefrom, means to clamp said handles together, a rod-like member secured at each edge of one of said grids on the side thereof opposite the handles, said member being bent to provide two parallel portions having a slot therebetween, said member being secured to the grid to dispose said slot in an inclined position, with the upper end thereof nearer said handle than the lower end, and the upper of said portions forming said slot having recesses therein facing the slot, the other of said grid members being provided at its side edges with trunnions slidably received in said slots to adjustably hinge the grid members together at one side thereof.

CAESAR ROSSINI.
TAZIO D. PIERAGOSTINI.